(12) United States Patent
Ors et al.

(10) Patent No.: US 6,731,639 B1
(45) Date of Patent: May 4, 2004

(54) MULTI PROTOCOL LABEL SWITCHING FOR MULTIPLE ACCESS SEGMENTS

(75) Inventors: Tolga Ors, Epping (GB); Julian Cable, Herts (GB); Catherine Rosenberg, West Lafayette, IN (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/539,123

(22) Filed: Mar. 30, 2000

(51) Int. Cl.⁷ .............................................. H04L 12/28
(52) U.S. Cl. ........................... 370/395.51; 370/395.52; 370/395.53; 370/395.54; 370/395.31; 370/395.32
(58) Field of Search .................................. 370/254, 255, 370/252, 395.31, 395.32, 395.5, 395.51, 395.52, 395.53, 395.54, 395.6, 235, 237, 238, 238.1

(56) References Cited

U.S. PATENT DOCUMENTS

| | | | | |
|---|---|---|---|---|
| 6,055,561 A | * | 4/2000 | Feldman et al. | 709/200 |
| 6,069,889 A | * | 5/2000 | Feldman et al. | 370/351 |
| 6,252,857 B1 | * | 6/2001 | Fendick et al. | 370/254 |
| 6,321,271 B1 | * | 11/2001 | Kodialam et al. | 709/241 |
| 6,374,303 B1 | * | 4/2002 | Armitage et al. | 709/242 |
| 6,483,833 B1 | * | 11/2002 | Jagannath et al. | 370/392 |
| 6,501,754 B1 | * | 12/2002 | Ohba et al. | 370/389 |
| 6,501,756 B1 | * | 12/2002 | Katsube et al. | 370/392 |
| 6,532,237 B1 | * | 3/2003 | Or et al. | 370/396 |
| 6,597,663 B1 | * | 7/2003 | Rekhter | 370/252 |
| 2002/0110119 A1 | * | 8/2002 | Fredette et al. | 370/389 |

\* cited by examiner

Primary Examiner—Wellington Chin
Assistant Examiner—Mark A Mais
(74) Attorney, Agent, or Firm—Barnes & Thornburg

(57) ABSTRACT

A communication system having a multiple access segment (2,48), which comprises a plurality of end systems (6,44) and a switching node (4,46) configured such that each end system can transmit packets to the switching node and such that the switching node can transmit packets which are received by all the end systems. The switching node comprises a switch (5,47) for switching packets from the end systems to intermediate destinations within the system, and the MA segment operates in accordance with a protocol which provides a quality of service requested by the end systems for the packets transmitted over the segment. The switching node comprises means for collating primary label routing information for packets to be transmitted from the end systems across the MA segment which primary label is dependent on the intermediate destination of the packet and the QoS requirement of the packet and is independent of the end system from which the packet originates and the switching node switches packets from the end users to the intermediate destinations using only the primary label.

45 Claims, 6 Drawing Sheets

MULTI PROTOCOL LABEL SWITCHING FOR MULTIPLE ACCESS SEGMENTS

FIELD OF THE INVENTION

The present invention relates to networks having multiple access (MA) segments and in particular Internet Protocol (IP) networks having MA segments over which multiple end systems communicate over the MA segment with one switching node. The MA segment can, for example, be any satellite, local multi-point distribution system, wireless LAN or cable modem system which uses IP quality of service (QoS) and has a switching node that can broadcast or multicast packets to all end systems and receive packets from all end systems. The end systems can be end user terminals, gateways between the MA segment and other networks or they can be interfacing switches between the MA segment and multiple end user terminals.

Such MA segments will generally operate in accordance with a layer It protocol, such as asynchronous transfer mode (ATM), frame relay or ethernet and will provide (QoS) levels required by the packets sent over the segment. Here the term packets is used to denote any parcel of information which is transmitted over such MA segments, for example ATM cells, Frame Relay Protocol Data Units or Ethernet Packets. In such systems each end system requires a different connection identifier or label, per QoS class and per next hop (or intermediate) destination, in order to communicate with the switching node. If there are many end systems, for example 10,000 end systems, 20 next hop destinations from the switching node and three QoS classes, then 60,000 different labels will be required. These labels will necessarily be relatively long and will therefore take up a lot of space in the headers of the packets transmitted over the MA segment, which space is a scarce resource. The large number of labels results in a large and complex routing table which has to be used by the switching node. Also, because each end system requires its own set of labels, label muting information has to be distributed to each end system individually which takes up signalling resource in the MA segment.

OBJECT OF THE INVENTION

The object of the invention is to reduce the number of labels used in such MA segments in order to reduce the size of the labels so that they take up less space in each packet transmitted over the MA segment and to reduce the size and complexity of the routing table used by the switching node. A further object of the invention is to reduce the number of packets that have to be transmitted over the MA segment in order to distribute the labels so as to reduce the amount of signalling resource taken up by label distribution.

SUMMARY OF THE INVENTION

According to the present invention thee is provided a communication system having a multiple access segment, which comprises a plurality of end systems and a switching node configured such that each end system can transmit packets over the MA segment to the switching node and such that the switching node can transmit packets over the MA segment which packets are received by all the end systems and the system operates in accordance with a protocol which provides a quality of service to the packets transmitted over the MA segment, wherein the number of labels used for switching by the switching node is limited to the number of intermediate (or next hop) destinations available to the switching node multiplied by the number of quality of service classes offered by the protocol.

There is also provided a communication system having a multiple access segment, which comprises a plurality of end systems and a switching node configured such that each end system can transmit packets over the MA segment to the switching node and such that the switching node can transmit packets over the MA segment which packets are received by all the end systems and the system operates in accordance with a protocol which provides a quality of service to the packets transmitted over the MA segment, wherein the switching node comprises means for collating primary label routing information for packets to be transmitted across the MA segment from the end systems such that each primary label is dependent on the intermediate destination of the packet and the QoS requirement of the packet and is independent of the end system from which the packet originates and the switching node switches packets using only the primary label.

In this way the number of labels used for switching by the switching node is much reduced. This number is significantly less than in known systems which allocate separate labels to each end system, per intermediate destination and per QoS class. This means that less space in each packet header is used for the primary label and that the label routing information, usually in the form of a routing table, used by the switching node and communicated to the end systems is less complex than in known systems. Also, because the label routing information is independent of the end system from which a packet originates, the same label routing information can be sent to each end system. Thus, the switching node can send the same packets of label routing information to all the end systems which packets will be received by all the end systems. In previous systems different label routing information was sent to each end system and so many more packets had to be sent over the MA segment in order to provide all the end systems with label routing information. Accordingly, the present invention significantly reduces the amount of signalling resource within the MA segment which is used for distributing label routing information to the end systems.

The MA segment may comprise a broadcast downlink over which the switching node transmits packets to the end systems or alternatively may comprise a multicast link over which the switching node transmits packets to the end systems.

The switching node will generally comprise at least one headend which receives incoming packets and a switch, more specifically, a label switch router (LSR), which can switch packets received from the end systems to intermediate or next hop destinations based only on the primary label. Part of the switching node, such as part of the switch, for example a switch controller may be located remotely from the headend.

As an alternative to, or in addition to, the switching node transmitting the primary label routing information, generally in the form of a routing table, to the end systems by broadcast or multicast, the end systems may comprise means for making on demand requests for primary labels from the switching node which requests set out the destination and the QoS required for a packet and the switching node comprises means for transmitting to all the end systems a set of label routing information including a mapping between the requested destination and QoS and the primary label. The set of label routing information sent may comprise the whole or a part of the label routing information for ad destination and QoS pairs. Because the set of information is received by all end systems, all the end systems will be able to use the set of information they receive to update their primary label routing information, thus reducing the number of on demand requests made by end systems across the MA segment which reduces the number of packets which have to transmitted across the MA segment in order to transmit the label routing information to all the end systems. This on-demand type of label distribution may be required if the broadcast or multicast is not totally reliable or if an end system becomes active just after the switching node has sent label routing information to all the end systems. Label routing information may be transmitted by the switching node at pre-determined time intervals or these transmissions may be event driven or driven by the network control policy for the communication system.

As the QoS required by a packet can be inferred from its primary label a scheduler on the switching node may use the primary label for scheduling.

The multiple access segment may be a satellite segment, a local multipoint distribution system, a wireless local area network or a cable modem network. Where the MA segment is a satellite segment, the switching node may include a satellite.

The present invention is particularly useful in communication systems which operate in accordance with an internet protocol.

Where the communication system operates in accordance with an internet protocol and the multiple access segment operates in accordance with an ATM protocol, the end systems may comprise segmentation means for segmenting an internet protocol packet into ATM cells and for locating the primary label in the VPI/VCI space of the ATM cell header.

Where the communication system operates in accordance with an internet protocol and the multiple access segment operates in accordance with frame relay, the end systems may comprise segmentation means for segmenting an internet protocol packet into frame relay Protocol Data Units (PDUs) and for locating the primary label in the Data Link Connection Identifier (DLCI) space of the frame relay PDU header.

Where the communication system operates in accordance with an internet protocol and the multiple access segment operates in accordance with a layer if media encapsulation protocol that has no native label structure (such as Ethernet Protocol or Point to Point Protocol (PPP)) the end systems may comprise encapsulation means for encapsulating an IP packet including means for locating the primary label in a shim header of the encapsulated IP packet.

According to a second aspect of the present invention there is provided a method of communication over a multiple access segment, which segment comprises a plurality of end systems which can transmit packets to a switching node and the switching node can transmit packets which packets are received by all the end systems, and the MA segment operates in accordance with a protocol which provides a quality of service requested by the end systems for the packets transmitted over the segment, wherein the number of labels used for switching by the switching node is limited to the number of intermediate destinations available to the switching node multiplied by the number of quality of service classes offered by the protocol.

There is also provided a method of communication over a multiple access segment, which segment comprise a plurality of end systems which can transmit packets to a switching node and the switching node can transmit packets which are received by all the end systems, and the MA segment operates in accordance with a protocol which provides a quality of service requested by the end systems for the packets transmitted over the segment, wherein the method comprises the steps of;

collating primary label routing information for packets to be transmitted across the MA segment from the end systems such that each primary label is dependent on the intermediate destination of the packet and the QoS requirement of the packet and is independent of the end system from which the packet originates, and switching packets from the end systems to the intermediate destinations at the switching node using only the primary label.

The method according to the second aspect of the present invention has the same advantages and preferred features mentioned above in relation to the communication system according to the first aspect of the present invention.

According to a third aspect of the present invention there is provided a switching node for a communication system having the features of the switching node of the communication system according to the first aspect of the present invention.

According to a fourth aspect of the present invention there is provided an end system for a communication system having the features of the end systems of the communication system according to the first aspect of the present invention.

BRIEF DESCRIPTION OF THE DRAWINGS

The present invention will now be described with reference to the accompanying Figures in which.

DETAILED DESCRIPTION OF INVENTION

Figure 1:
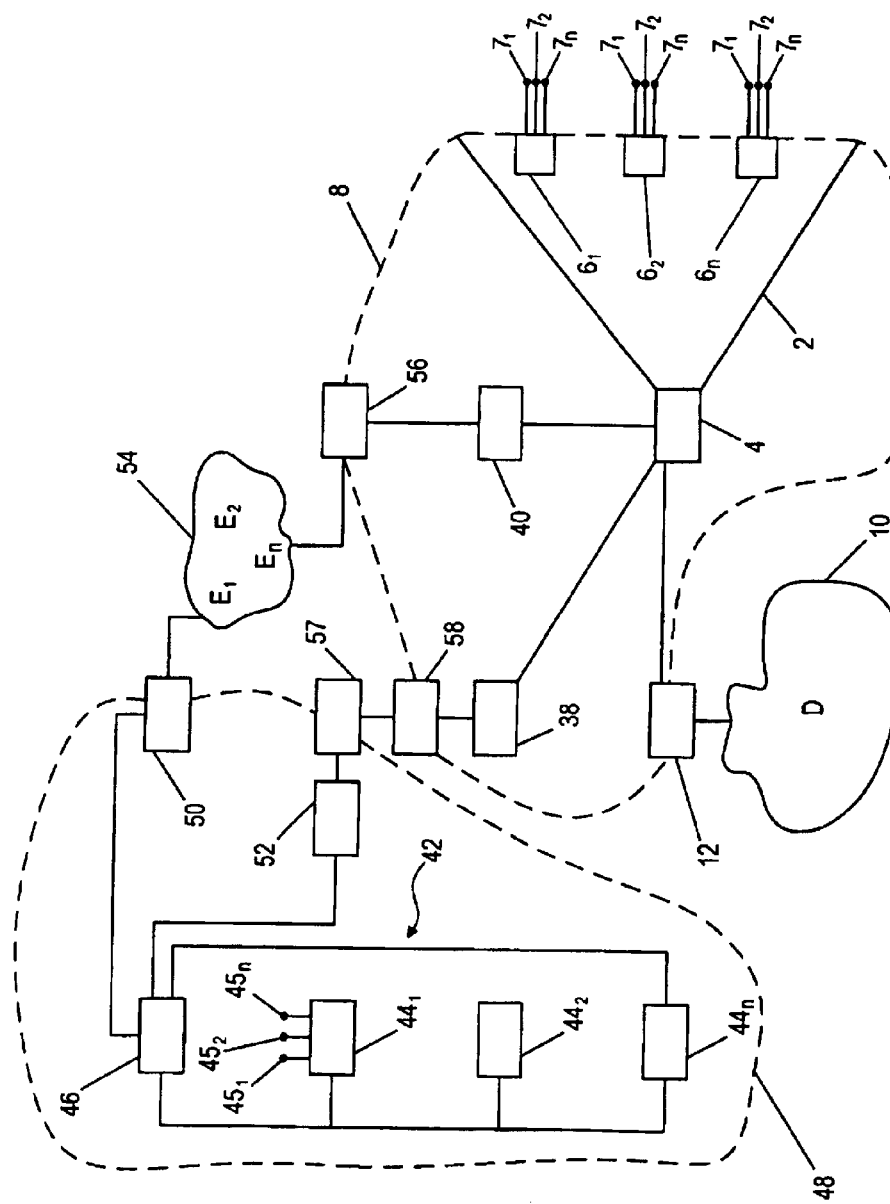
FIG. 1 shows schematically an Internet Protocol (IP) network having at least one multiple access (MA) segment and operating with multi-protocol label switching according to the present invention.
Figure 4A:
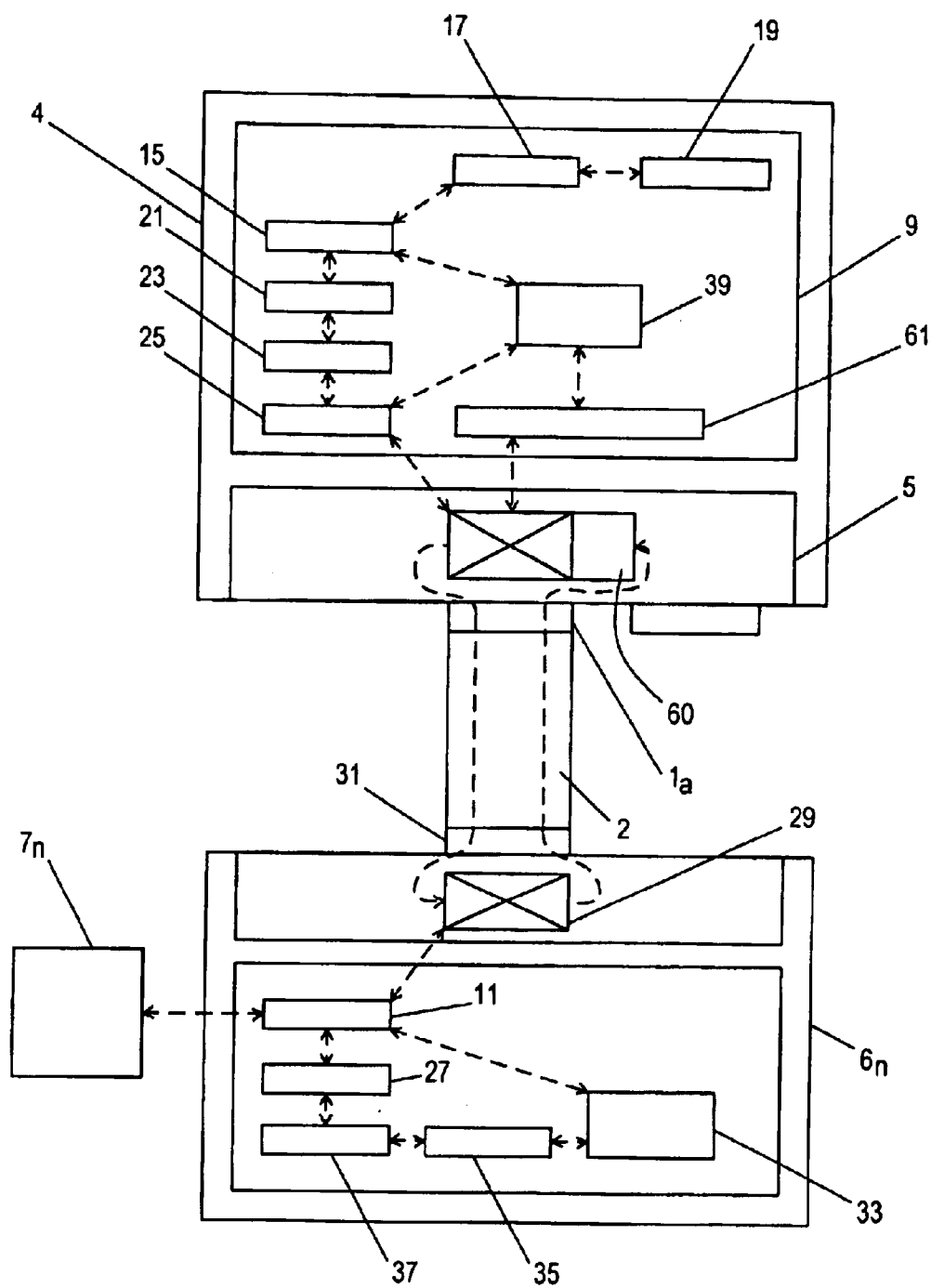
FIG. 4a shows an example of the components making up a switching node and one end system, where the MA segment operates in accordance with the ATM Protocol.

The Internet Protocol (IP) network of FIG. 1 comprises a multiple access (MA) segment (2) served by a switching node (4), such as a radio bass station or a satellite. The structure of the switching node (4) is shown in FIG. 4a and comprises at least one headend (1a) and a switch, more specifically a label switch router comprising a switching function (5) and a switch controller (9). The (MA) segment (2) comprises a broadcast downlink over which the switching node (4) broadcasts simultaneously to all the end systems ($6_1$, $6_2$, . . . $6_n$) within the MA segment. The MA segment (2) also comprises an alternative, such as a multi frequency time division multiple access (MFTDMA) uplink over which each end system ($6_1$, $6_2$, . . . $6_n$) can communicate with the switching node (4). There may be a high number of end systems within a single MA segment (2). As an alternative to MFTDMA the segment (2) could use time division multiple access (TDMA), frequency division multiple access (FDMA) or code division multiple access (CDMA) on its uplink to the switching node (4).

Figure 5:
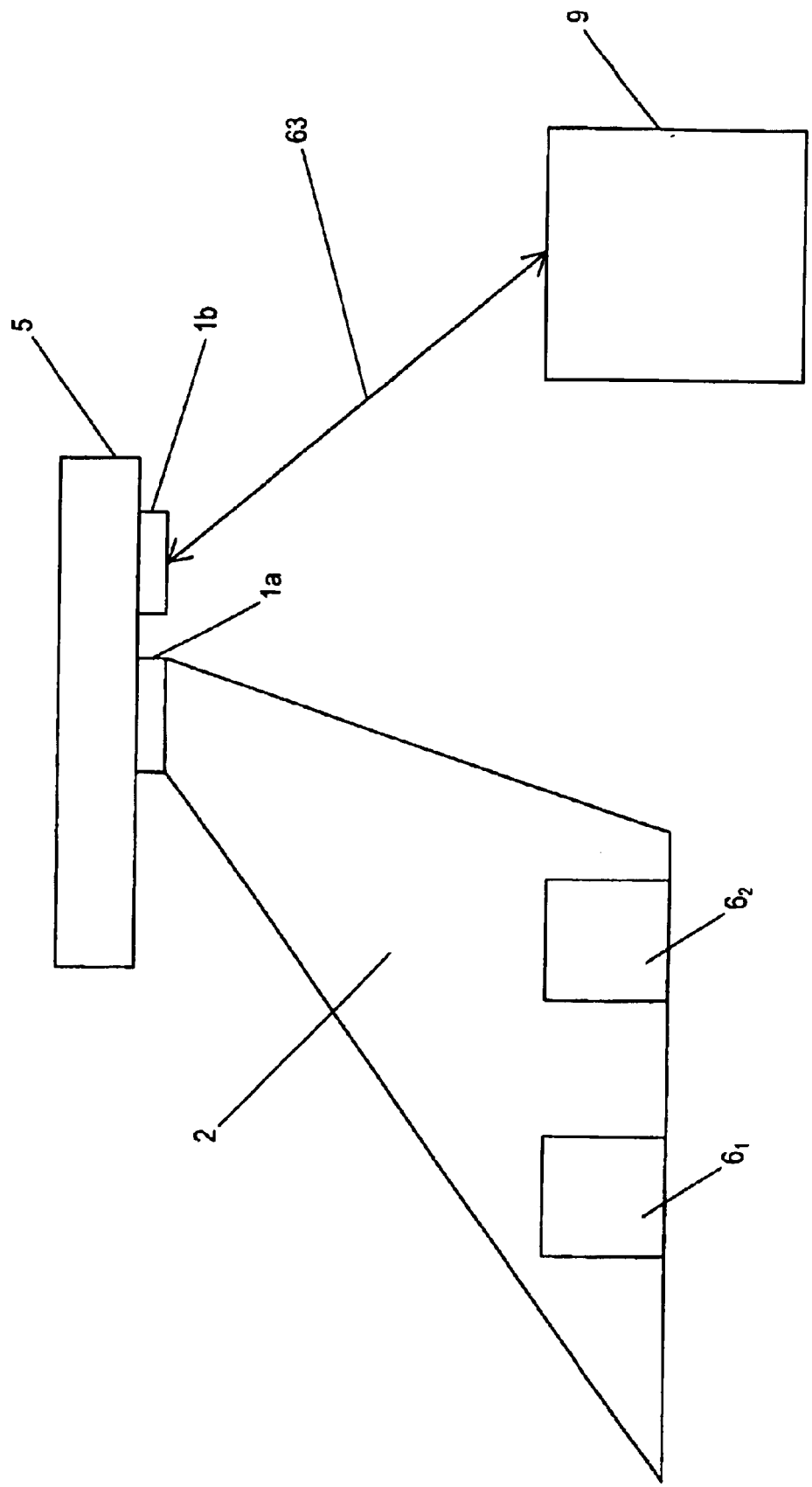
FIG. 5 shows an example of a switching node which has a switch controller located remotely from a headend of the switching node.

Part of the switching node (4) can be located remotely from the headend (1a), as shown in FIG. 5. In FIG. 5 the headend (1a) and the switching function (5) of the label switch router (LSR) are co-located and the switch controller (9) of the label switch router is located remotely from the headend (1a) and LSR (5). The switch controller (9) communicates with the switching function (5) via a point to point link (63) via headend (1b).

Each end system ($6_1$, $6_2$, ... $6_n$) may provide an interface between multiple end user terminals ($7_1$, $7_2$, ... $7_n$) and the MA segment (2), which end user terminals ($7_1$, $7_2$, ... $7_n$) operate in accordance with IP. Where the MA segment (2) uses a layer II ATM protocol, the end systems, ($6_1$, $6_2$, ... $6_n$) will be label edge routers (LERs) and have the structure shown in FIG. 4a for end system ($6_n$). The LERs will receive IP packets from the end user terminals ($7_1$, $7_2$, ... $7_n$), for example end user terminal ($7_n$) in FIG. 4a, and segment them to form ATM cells using segmentation and reassembly unit (SAR) (11). These ATM cells will then be transmitted by the end system ($6_n$) over the MA segment. The ATM cells will be constructed by the SAR (11) so as to contain a multi protocol label switching (MPLS) label according to the present invention, which label is obtained from an MPLS database (33) held by the end system. The MPLS database (33) will contain the last set of label routing information broadcast by the switching node (4). The label switch router (5) of the switching node (4) will use this MPLS or primary label for switching the ATM cells it receives to their intermediate destinations.

Each end system ($6_1$, $6_2$, ... $6_n$) will want to communicate with other parts of the IP network, hereafter called destinations. Each destination will have associated with it an IP destination address. For IP Version 4 (IPV4) the IP destination address will occupy 4 bytes of a 20 byte IP packet header and for IP Version 6 (IPV6) the IP destination address will occupy 16 bytes of a 40 byte IP packet header. Each IP packet received by the end systems ($6_1$, $6_2$, ... $6_n$) from its associated end user terminals ($7_1$, $7_2$, ... $7_n$) will have a quality of service (QoS) requirement associated with it which determines the priority with which it is switched through the IP network. Accordingly, many of the cells received by the switching node (4) from the end systems will have the same QoS requirement and will be routed by the switching node to same intermediate destination.

The IP networks may have several Autonomous Systems (AS) or Networks, such as the segment (8) shown in dotted lines which operates using a layer II switching protocol, in this case ATM.

The switching node (4) is located in the network segment (8) and as shown can directly communicate with three other switches, label switch routers (LSRs) (38,40) or label edge router (LER) (12). Accordingly, switching node (4) has three intermediate destinations (12, 38, 40) (if the end systems ($6_1$, $6_2$, ... $6_n$) are discounted as intermediate destinations for the sake of this example) via which the packets it receives from the end systems ($6_1$, $6_2$, ... $6_n$) can be routed to destinations in other parts of the IP network of FIG. 1. The LSRs (40) and (38) may be connected to a plurality of further switches, such as LER (56) and LER (58) respectively, not all of which are shown in FIG. 1. The LER (12) forms a gateway into IP network (10) and provides an interface between the ATM protocol used in segment (8) and the IP used in network (10). Assume that the internet protocol used in the network provides three levels of QoS; Premium, Assured and Best Effort (which are called Class of Service), then it can be seen that switching node (4) requires only nine multi-protocol label switching (MPLS) labels according to the routing table below:

| MPLS Label | QoS | Intermediate Destination |
| --- | --- | --- |
| 1000 | Premium | LER (12) |
| 0111 | Premium | LSR (38) |
| 0110 | Premium | LSR (40) |
| 0101 | Assured | LER (12) |
| 0100 | Assured | LSR (38) |
| 0011 | Assured | LSR (40) |
| 0010 | Best Effort | LER (12) |
| 0001 | Best Effort | LSR (38) |
| 0000 | Best Effort | LSR (40) |

The switch controller (9) of the switching node (4) assembles this routing table using the Label Distribution Protocol (LDP) Deamon (15) in accordance with label distribution protocols standardised by the Internet Engineering Task Force and by interrogating routing database (17) controlled by routing deamon (19). The relevant label routing information is then assembled into IP packets by units (21,23) and segmented in SAR (25) to form ATM cells which are broadcast to all end systems over the MA segment (2). Because this label routing information is the same for all end systems, each end system can receive the same packets that are sent by the switching node over the broadcast downlink of the MA segment (2). This greatly reduces the signalling overhead associated with providing the end systems with label routing information as compared to systems in which each end system requires different label routing information so that label routing information has to be sent in separate packets to each end system.

Alternatively or additionally, the end systems ($6_1$, $6_2$, ... $6_n$) may make on-demand requests for an MPLS label for the QoS and destination to which they want to send a packet, They may wish to do this, for example, where the end system missed last the broadcast of label routing information because it was not active Referring to FIG. 4, the end system ($6_n$) when receiving an IP packet from an end user ($7_n$) starts to segment the IP packet into ATM cells at the SAR (11). The SAR (11) needs the MPLS label associated with the IP destination address and the QoS required by the IP packet and interrogates the MPLS database (33). If this label routing information is not available then the LDP deamon (35) generates a LDP 'label request' message This is encapsulated into a TCP packet at encapsulation unit (37), which is assembled into an IP packet in IP packet assembly unit (27). This IP packet is segmented into ATM cells in SAR (11) and an MPLS label associated with the switching node (4) is inserted into the front of the VPI/VCI space of he cells. This label is available to the end system ($6_n$) from the time it logs-on to the MA segment and so these ATM cells can be transmitted to the switching node (4) over the MA segment (2).

When these ATM cells are received by the label switch router (5) via the headend (1a) of the switching node (4) they are directed to the switch controller (9) where that are assembled by SAR (25) into an IP packet. The TCP packet is recovered by unit (23) and the request message is recovered by unit (21) and forwarded to the LDP deamon (15) The LDP deamon asks the MPLS database (39) for the relevant label. The LDP messages are encapsulated in Transmission Control Protocol (TCP) packets in encapsulation unit (21), which TCP packets are encapsulated in IP packets by IP packet assembly unit (23). The IP packets are then segmented into ATM cells by the SAR (25) for transmission to the end systems ($6_1, 6_2, \ldots 6_n$). All end systems ($6_1, 6_2, \ldots 6_n$) including end system ($6_n$) will receive these cells and recover from them the relevant label routing information and use the information to update their MPLS databases, eg. database (33) of end system ($6_n$). As all the end systems receive this label routing message, the number of on-demand requests made by the end systems ($6_1, 6_2, \ldots 6_n$) to the switching node for MPLS labels will be significantly reduced. End system ($6_n$) can now complete the segmentation of the packet it received from the end user terminal ($7_n$) using the relevant label routing information which the MPLS database (33) now has. The relevant primary label is inserted by the SAR (11) into the front of the VPI/VCI space of the resulting ATM cells. These ATM cells are then transmitted over the MA segment and are switched to their intermediate destination by LSR (5) which is controlled by ATM switch controller (61) based on the label routing information in the MPLS database (39).

Figure 2:
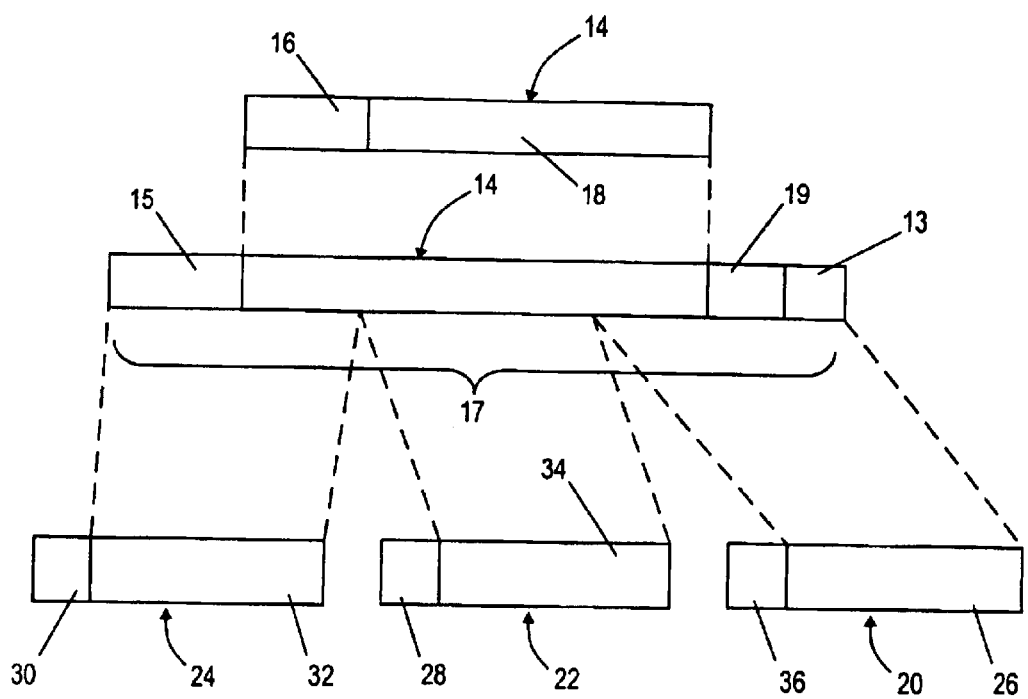
FIG. 2 shows an IP packet and the ATM cells generated by segmentation of the packet.

Referring now to FIG. 2, when an end user terminal ($7_n$) wishes to send data to destination (D) in IP network (10) it will do so by assembling an IP packet (14), with a header (16) in which is located the IP destination address for a destination (D) in the network (10) and with a payload (18) containing the data. This packet (14) is then sent by end user terminal ($7_n$) to its associated end system, for example end system ($6_n$) in FIG. 4, where it undergoes packet segmentation in an AAL 5 layer of the end system using an ATM packet segmentation and reassembly unit (SAR) (11). In this packet segmentation process the packet (14) has added to it a Link Logical Control (LLC) header (15), a trailer (13) and padding (19) to make the data packet (17) a multiple of 48 bytes. The data packet (17) is then split into the 48 byte payloads (32,34,26) of a number of ATM cells (20,22,24), each cell having an ATM header (36,28,30). According to the present invention the SAR (11) interrogates the MPLS database (33) and locates the appropriate MPLS label in the ATM cell headers (36,28,30) which label is associated with the QoS and the destination of the IP packet, in accordance with the label muting information last broadcast to the end system ($6_n$). The MPLS label will be located at the front of the VPI field of the ATM cell header. A secondary label used by the intermediate destination (12) for further switching to destination (D) and for packet reassembly is located behind the primary label in the ATM cell header by the SAR (11) in the end system ($6_n$).

For example, if terminals ($6_1$), ($6_2$) and ($6_n$) all wish to send a packet to respective destinations $D_1$, $D_2$ and $D_n$ in network (10) then each packet can be routed via the same intermediate destination LER (12) and if each packet requires the same QoS, for example premium, all the cells assembled from the three packets can be allocated the same MPLS label, in this case '1000'. In this way the resulting cells from the terminals ($6_1$), ($6_2$) and ($6_n$) are all merged at the switching node (4) and flow together to their intermediate destination LER (12). In this way the label switch router (5) of the switching node (4) need only switch on the MPLS label at the front of the VPI space of the ATM cell header.

It can be seen that the present invention significantly reduces the numbers of labels in the switching node routing table compared with the conventional labelling method in which each end system needs a different label (connection identifier) per QoS to communicate with a destination This significantly reduces the size of the routing tables used by the switching node (4) and the end systems ($6_1, 6_2, \ldots 6_n$).

At the LER (12) the packet (14) can be reassembled from the cells (20,22,24) using the secondary label contained within the ATM header, behind the MPLS label and can be switched to its destination D in the IP network (10) using the IP packet address of the thus assembled packet.

The ATM cells received from the switching node (4) by LSRs (38, 40) will have to be re-labelled, for example, depending on their next intermediate destination and their QoS requirements, again using data contained within the ATM header, behind the MPLS label.

Scheduling of cells from the end systems ($6_1, 6_2, \ldots 6_n$), for example end system ($6_n$) of FIG. 4a, at the label switch router (5) of the switching node (4) using a scheduler (60) is also based on the MPLS label at the front of the ATM header VPI space in each cell. This is because the MPLS label can be used to infer the QoS required by each cell. The drop precedence that should be allocated to a cell would be dependant on a cell loss priority field within the ATM cell header, behind the MPLS label.

The network segment (8) could operate in accordance with Frame Relay instead of ATM. In such an arrangement the switching node structure (4) and end system structure ($6_n$) shown in FIG. 4c could be used with the ATM SARs (11) and (26) replaced by Frame Relay SARs (11") and (25"). The structures shown in FIG. 4c would operate in an equivalent way using Frame Relay as discussed above in relation to FIG 1a for the ATM network segment (8) discussed above.

Figure 4B:
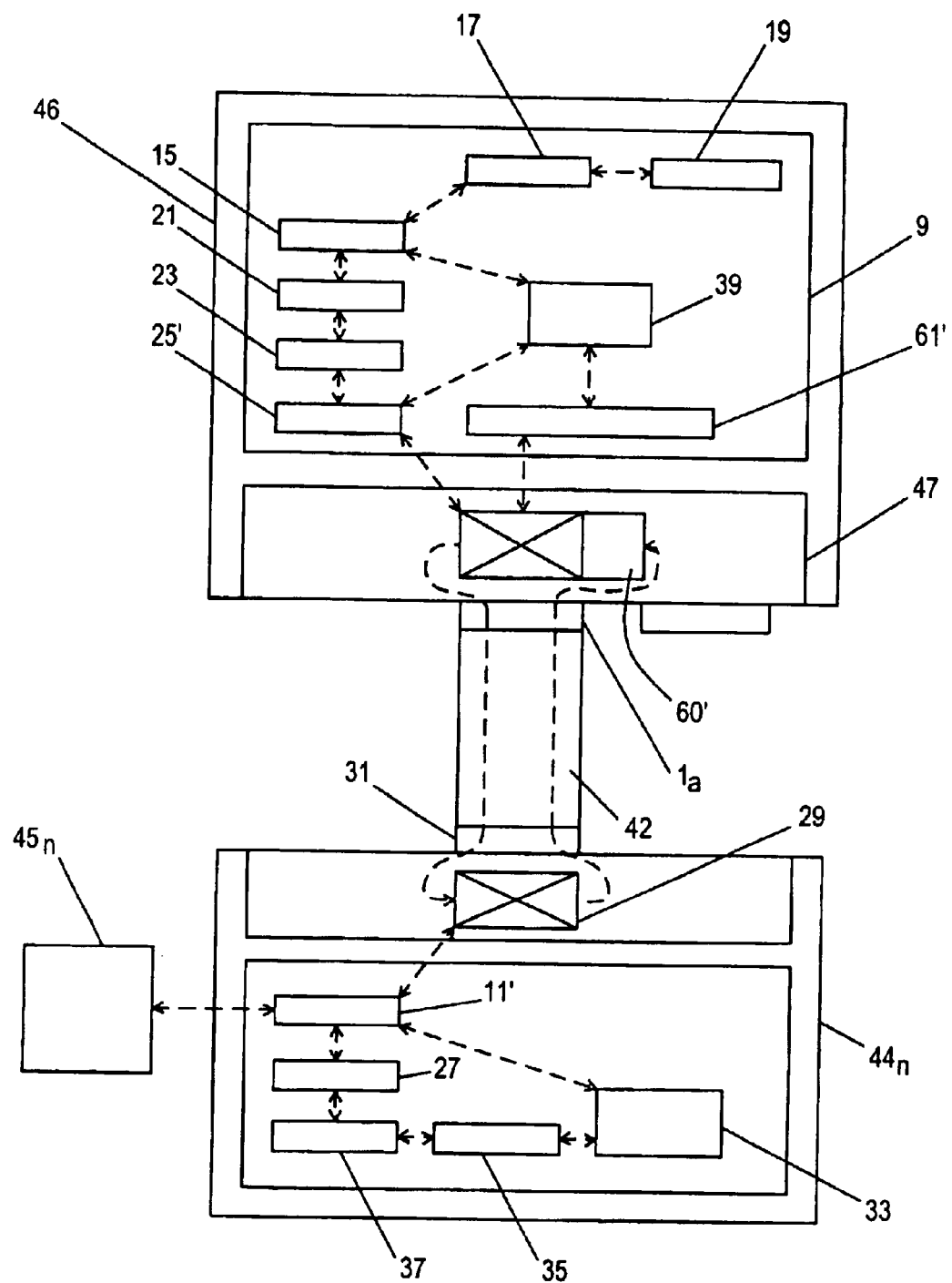
FIG. 4b shows an example of the components making up a switching node and one end system, where the MA segment operates in accordance with the Ethernet Protocol.
Figure 4C:
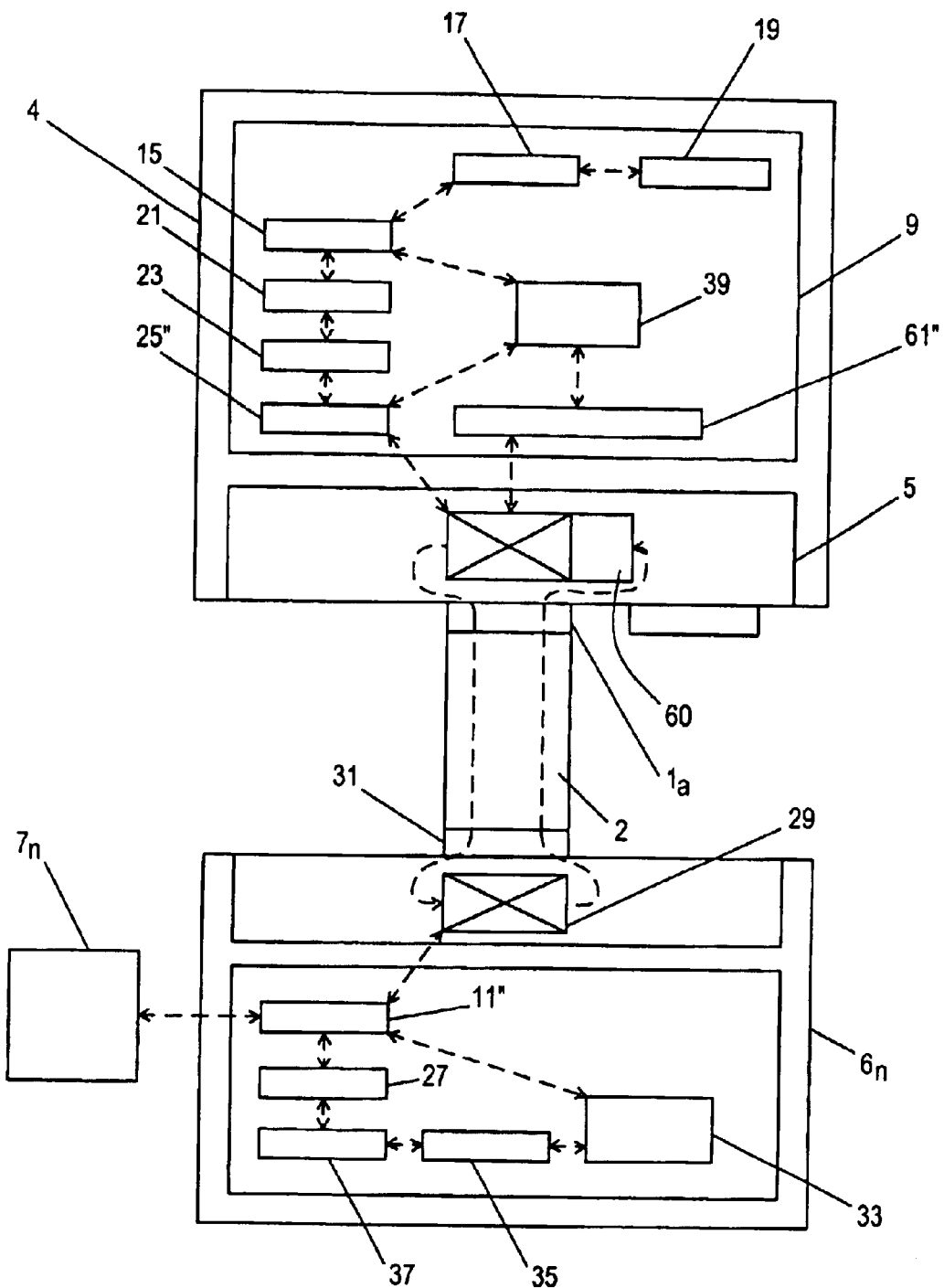
FIG. 4c shows an example of the components making up a switching node and one end system, where the MA segment operates in accordance with the Frame Relay Protocol.

The IP network of FIG. 1 also comprises a multicast segment (42), such as a radio base station segment which comprises a plurality of end systems ($44_1, 44_2, \ldots, 44_n$) which communicate with the rest of the IP network via a switching node (46), comprising a label switch router (47) (See FIG. 4c). The switching node (46) communicates with all the end systems ($44_1, 44_2, \ldots 44_n$) using a multicast communication system, such as Time Division Multiplexing (TDM).

Each end system ($44_1, 44_2, \ldots 44_n$) will want to send packets to destinations in the IP network which packets will have QoS requirements. Many of the packets received by the switching node (46) from the end systems will have the same QoS requirement and will be routed by the headend to same intermediate destination. Network segment (48) shown in doffed lines operates using a switching protocol, such as Ethernet.

The switching node (46) is located in the ethernet network segment (48) and as shown can directly communicate with LER (50) and LSR (52). Accordingly, switching node (4) has two intermediate destinations (50, 52) (if the end systems ($44_1, 44_2, \ldots 44_n$) are not considered as intermediate destinations for the sake of this example) via which the packets it receives from the end systems ($44_1, 44_2, \ldots 44_n$) can be routed to destinations in other parts of the IP network of FIG. 1. LER (50) and LSR (52) can each be connected to multiple downstream switches, end user terminals and/or networks, which are not shown in FIG. 1 and to which packets received by them can be switched. Assume that the IP provides three levels of QoS; Premium, Assured and Best Effort, then it can be seen that headend (46) requires only six MPLS labels according to the routing table below:

| MPLS Label | QoS | Intermediate Destination |
| --- | --- | --- |
| 101 | Premium | LER (50) |
| 100 | Premium | LSR (52) |
| 011 | Assured | LER (50) |
| 010 | Assured | LSR (52) |
| 001 | Best Effort | LER (50) |
| 000 | Best Effort | LSR (42) |

The switching node (46) and end system (44$_n$) will have a structure shown in FIG. 4b, which is similar to FIG. 4a, with like parts identified by like numerals, except that the ATM SAR (25) is replaced by an Ethernet encapulation unit (25') and the ATM SAR (11) is replaced by an Ethernet encapulation unit (11'). The switching node (46) will operate in the same way as described above to assemble the MPLS label routing table. It will periodically multicasts this routing table to the end systems (44$_1$, 44$_2$, ... 44$_n$) by encapsulating the IP packet generated by IP packet assembly unit (23) into an Ethernet packet using Ethernet encapsulation unit (25'). Alternatively, the end systems could make on-demand requests for an MPLS label for the QoS and destination to which they want to send a packet on demand. The request information would be formed into an IP packet as discussed above and encapsulated in an Ethernet packet by Ethernet packet encapsulating unit (11') for transmission across the MA segment by the end systems. The IP packet would be recovered from the Ethernet packet by the encapsulation unit (25') and the relevant label routing information would be extracted from the MPLS database (39) as described in relation to FIG. 4a. The switching node (46) then sends the requested MPLS label routing information to the end user by a multicast communication by assembling an IP packet containing the requested MPLS label routing information as discussed above and encapsulating it in an Ethernet packet using unit (25'). All other end users would also receive this MPLS label routing information and could use it to update their own label routing table. Then the number of on-demand requests by the end systems (44$_1$, 44$_2$, ... 44$_n$) to the headend (46) for MPLS labels would be significantly reduced.

Figure 3:
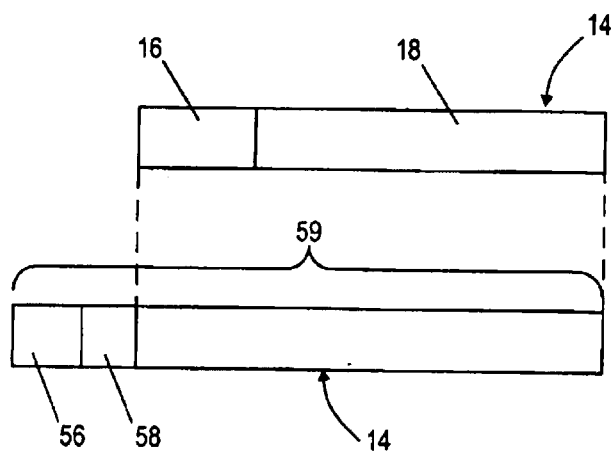
FIG. 3 shows an IP packet and an ethernet packet generated by encapsulation of the packet.

Referring now to FIG. 3, when end system (44$_n$) receives an IP packet (14) from end user (47$_n$) which is to be sent to destination network (54) it will do so using encapsulation unit (11') to encapsulate the IP packet (14) in a ethernet packet (59) by adding a shim header (58) and an ethernet header (56). According to the present invention each shim header (58) contains the MPLS label associated with the QoS and the intermediate destination of the message, in accordance with the routing table (above) last multicast to the end system (44$_1$). The MPLS label obtained from the MPLS database (33) will be located in the label field of the shim header label field by the encapsulation unit (11'). A secondary label used by intermediate destinations (50,52) for further switching or for packet reassembly is located behind the MPLS label in the shim header (58) by the encapsulating unit (11'). Thus, if terminals (44$_1$), (44$_2$) and (44$_n$) all wish to communicate with respective destinations E$_1$, E$_2$ and E$_n$ in network (54) and so can be routed via the same intermediate destination LER (50) and require the same QoS, for example premium, all the cells of the three messages can be allocated the same MPLS label, in this case '101'. In this way the messages from the terminals (44$_1$), (44$_2$) and (44$_n$) are all merged at the switching node (46) and flow together to their intermediate destination LER (50).

At the LER (50) the packet (14) is recovered and forwarded directly to its destination E$_1$ in the IP network (54) using the layer III IP protocol or segmented or re-encapsulated and forwarded using a layer II protocol, depending on the nature of the network (54). Ethernet packets received by LSR (52) will have to be re-labelled, for example, depending on their next intermediate destination and their QoS requirements, again using data contained in the label field within the shim header.

Scheduling at the scheduler (60') of switching node (46), would also be based on the primary MPLS label at the front of the shim header because this label can be used to infer the QoS required by each ethernet packet the drop precedence that should be allocated to a cell would be dependent on the class of service field (CoS) in the shim header.

What is claimed is:

1. A communication system having a multiple access (MA) segment, which comprises a plurality of end systems and a switching node configured such that each end system can transmit packets to the switching node and such that the switching node can transmit packets which are received by all the end systems, and the system operates in accordance with a protocol which provides a quality of service (QoS) for the packets transmitted over the MA segment, wherein the number of labels used for switching by the switching node is limited to the number of intermediate destinations available to the switching node multiplied by the number of quality of service classes offered by the protocol.

2. A communication system according to claim 1 wherein the switching node comprises means for collating primary label routing information for packets to be transmitted across the MA segment from the end systems in which each primary label is dependent on the intermediate destination of the packet and the QoS requirement of the packet and is independent of the end system from which the packet originates and the switching node switches packets using only the primary label.

3. A communication system according to claim 1 wherein the switching node comprises a headend and a label switch router.

4. A communication system according to claim 1 wherein the switching node comprises a headend and part of the switching node is located remote from the headend.

5. A communication urn according to claim 1 wherein the MA segment comprises a broadcast downlink over which the switching node transmits packets to the end systems.

6. A communication system according to claim 1 wherein the MA segment comprises a multicast link over which the switching node transmits packets to the end systems.

7. A communication system according to claim 1 wherein the switching node comprises mean for collating primary label routing information for packets to be transmitted across the MA segment from the end systems in which each primary label is dependent on the intermediate destination of the packet and the QoS requirement of the packet and is independent of the end system from which the packet originates and the switching node switches packets using only the primary label and the end systems comprise means for making on demand requests for primary labels from the switching node which requests set out the destination and the QoS required for a packet and the switching node comprises means for transmitting to all the end systems a mapping between the requested destination and QoS and the primary label.

8. A communication system according to claim 1 wherein the switching node comprises means for collating primary label routing information for packets to be transmitted across the MA segment from the end systems in which each primary label is dependent on the intermediate destination of the packet and the QoS requirement of the packet and is independent of the end system from which the packet originates and the switching node switches packets using only the primary label and the end systems comprise means for adding a secondary label to the packet header which secondary label is used by an intermediate destination for further switching of the packet or for packet reassembly.

9. A communication system according to claim 1 wherein the switching node comprises means for collating primary label routing information for packets to be transmitted across the MA segment from the end systems in which each primary label to dependent on the intermediate destination of the packet and the QoS requirement of the packet and is independent of the end system from which the packet originates and the switching node switches packets using only the primary label and comprises means for scheduling packets received from the end systems dependent only on the primary label.

10. A communication system according to claim 1 wherein the multiple access segment is a satellite segment in which the switching node includes a satellite.

11. A communication according to claim 1 wherein the multiple access segment is a local multipoint distribution system.

12. A communication system according to claim 1 wherein the multiple access segment is a wireless local area network.

13. A communication system according to claim 1 wherein the multiple access segment is a cable modem network.

14. A communication system according to claim 1 which operates in accordance with an internet protocol.

15. A communication system according to claim 1 wherein the switching node comprises means for collating primary label routing information for packets to be transmitted across the MA segment from the end systems in which each primary label is dependent on the intermediate destination of the packet and the QoS requirement of the packet and is independent of the end system from which the packet originates and the switching node switches packets using only the primary label and the system operates in accordance with an internet protocol and the multiple access segment operates in accordance with an ATM protocol and the end systems comprise segmentation means for segmenting an internet protocol packet into ATM cells and for locating the primary label in the VPI/VCI space of the ATM cell header.

16. A communication system according to claim 1 wherein the switching node comprises means for collating primary label routing information for packets to be transmitted across the MA segment from the end systems in which each primary label is dependent on the intermediate destination of the packet and the QoS requirement of the packet and is independent of the end system from which the packet originates and switching node switches packets using only the primary label and the system operates in accordance with an internet protocol and the multiple access segment operates in accordance with a layer II media encapsulation protocol and the end systems comprise encapsulation means for encapsulating an internet protocol packet into an ethernet packet and for locating the primary label in the shim header of the ethernet packet.

17. A communication system according to claim 1 wherein the switching node comprises means for collating primary label routing information for packets to be transmitted across the MA segment from the end systems in which each primary label is dependent on the intermediate destination of the packet and the QoS requirement of the packet and is independent of the end system from which the packet originates and switching node switches packets using only the primary label and the communication system operates in accordance with an internet protocol and the multiple access segment operates in accordance with Frame Relay and the end systems comprise segmentation means for segmenting an internet protocol packet into frame relay Protocol Data Units (PDUs) and for locating the primary label in the Data Link Connection Identifier (DLCI) space of the frame relay PDU header.

18. A method of communication over a multiple access (MA) segment, which segment comprises a plurality of end systems which can transmit packets to a switching node and the switching node can transmit packets which are received by all the end systems, and the MA segment operates in accordance with a protocol which provides a quality of service (Q) requested by the end systems for the packet transmitted over the segment, wherein the number of primary labels used for switching by the switching node is limited to the number of intermediate destinations available to the switching node multiplied by the number of quality of service classes offered by the protocol.

19. A method according to claim 18 wherein the method comprises the steps of;
    collating primary label routing information for packets to be transmitted across the MA segment from the end systems such that the primary label is dependent on the intermediate destination of the packet and the QoS requirement of the packet and is independent of the end system from which the packet originates, and
    switching packets from the end users to the intermediate destinations at the switching node using only the primary label.

20. A method according to claim 18 wherein switching node transmit packets to the end systems over a broadcast downlink.

21. A method according to claim 18 wherein switching node transmits packets to the end systems over a multicast link.

22. A method according to claim 18 wherein the method comprises the steps of;
    collating primary label routing information for packets to be transmitted across the MA segment from the end systems such that the primary label is dependent on the intermediate destination of the packet and the QoS requirement of the packet and is independent of the end system from which the packet originates,
    switching packets from the end users to the intermediate destinations at the switching node using only the primary label, the end systems making on demand requests for primary labels from the switching node which requests set out the destination and to QoS required for a packet, and the switching node allocating a primary label to the requested destination and QoS and transmitting to all the end systems a mapping between the requested intermediate destination and QoS and the primary label.

23. A method according to claim 18 wherein the method comprises the steps of;
    collating primary label routing information for packets to be transmitted across the MA segment from the end systems such that the primary label is dependent on the intermediate destination of the packet and the QoS requirement of the packet and is independent of the end system from which the packet originates, switching packets from the end users to the intermediate destinations at the switching mode using only the primary label, and adding a secondary label to the packet headers of packets transmitted by the end systems which secondary label is used by intermediate destinations for further switching of the packet or for packet reassembly.

24. A method according to claim 18 wherein the method comprises the steps of;

collating primary label routing information for packets to be transmitted across the MA segment from the end systems such that the primary label is dependent on the intermediate destination of the packet and the QoS requirement of the packet and is independent of the end system from which the packet ordinates, switching packets from the end users to the intermediate destinations at the switching node using only the primary label, and scheduling packets received by the switching node from the end users using the primary label.

25. A method according to claim 18 wherein the multiple access segment is a satellite segment in which the switching node includes a satellite.

26. A method according to claim 18 wherein the multiple access segment is a local multipoint distribution system.

27. A method according to claim 18 wherein the multiple access segment is a wireless local area network.

28. A method according to claim 18 wherein the multiple access segment is a cable modem network.

29. A method according to claim 18 which operates in accordance with an internet protocol.

30. A method according to claim 18 which operates in accordance with an internet protocol and in which the multiple access segment operate in accordance with an ATM protocol wherein the method comprises the steps of;

collating primary label routing information for packets to be transmitted across the MA segment from the end systems such that the primary label is dependent on the intermediate destination of the packet and the QoS requirement of the packet and is independent of the end system from which the packet originates, switching packet from the end users to the intermediate destinations at the switching node using only the primary label, and end systems segmenting internet protocol packets into ATM cells and locating the primary label in VPI/VCI space of the ATM cell header.

31. A method according to claim 18 which operates in accordance with an internet protocol and in which the multiple access segment operates in accordance with a layer II media encapsulation protocol wherein the method comprises the steps of;

collating primary label routing information for packets to be transmitted across the MA segment from the end systems such that the primary label is dependent on the intermediate destination of the packet and the QoS requirement of the packet and is independent of the end system from which the packet originates, switching packets from the end users to the intermediate destinations at the switching node using only the primary label, and end systems encapsulating internet protocol packets within ethernet packets and locating the primary label in the shim header of the ethernet packet.

32. A method according to claim 18 which operates in accordance with an internet protocol and in which the multiple access segment operates in accordance with a layer II media encapsulation protocol wherein the method comprises the steps of;

collating primary label routing information for packets to be transmitted across the MA segment from the end systems such that the primary label is dependent on the intermediate destination of the packet and the QoS requirement of the packet and is independent of the end system from which the packet originates, switching packets from the end users to the intermediate destinations at the switching node using only the primary label, and end systems segmenting internet protocol packet into Frame Relay Protocol Data Units and locating the primary label in Data Link Connection Identifier space of the Frame Relay Protocol Data Unit header.

33. A switching node for a multiple access (MA) segment of a communication system, which segment comprises a plurality of end systems and is configured such that each end system can transmit packets to the switching node and such that the switching node can transmit packets which are received by all end systems and the system operates in accordance with a protocol which provides a quality of service (QoS) requested by the end systems for the packets transmitted over the segment, wherein the number of primary labels used for switching by the switching node is limited to the number of intermediate destinations available to the switching node multiplied by the number of quality of service classes offered by the protocol.

34. A switching node according to claim 33 wherein the switching node comprises means for collating primary label routing information for packets to be transmitted across the MA segment from the end systems, such that the primary label is dependent on the intermediate destination of the packet and the QoS requirement of the packet and is independent of the end system from which the packet originates, and switching node switches packets from the end systems to the intermediate destinations using only the primary label.

35. A switching node according to claim 33 wherein the MA segment comprises a broadcast downlink over which the switching node transmits packets to the end systems.

36. A switching node according to claim 33 wherein the MA segment comprises a multicast link over which the switching node transmits packets to the end systems.

37. A switching node according to claim 33 wherein the switching node comprises a headend and a label switch router.

38. A switching node according to claim 33 wherein the switching node comprises a headend and part of the switching node is located remote from the headend.

39. A switching node according to claim 33 wherein the switching node comprises means for collating primary label routing information for packets to be transmitted across the MA segment from the end systems, such that the primary label is dependent on the intermediate destination of the packet and the QoS requirement of the packet and is independent of the end system from which the packet originates, and the switching node packets from the end systems to the intermediate destinations using only the primary label and the switching node comprises means for receiving on demand requests for primary labels from end systems which requests set out the destination and the QoS required for a packet and the switching node comprises means for transmitting to all end systems a mapping between the requested destination and QoS a the primary label.

40. A switching node according to claim 33 wherein the switching node comprises means for collating primary label routing information for packets to be transmitted across the MA sent from the end systems, such that the primary label is dependent on the intermediate destination of the packet and the QoS requirement of the packet and is independent of the end system from which the packet originates, and the switching node switches packets from the end systems to the intermediate destinations using only the primary label and the switching node comprises means for scheduling packets received from end systems dependent only on the primary label.

41. A switching node according to claim 33 wherein the multiple access segment is a satellite segment in which the switching node includes a satellite.

42. An end system for operating within a multiple access (MA) segment of a communication systems segment comprises a plurality of end systems arranged such that each end system can transmit packets to a switching node and such that the switching node can transmit packets which are received by all the end systems, and which segment operates in accordance with a protocol which provides a quality of service (QoS) requested by the end systems for the packets transmitted over the segment, wherein the number of primary labels used for switching by the switching node is limited to the number of intermediate destinations available to the switching node multiplied by the number of quality of service classes offered by the protocol.

43. An end system according to claim 42 wherein the end system comprises means for assembling a packet to be transmitted by the end system across the segment and for placing a primary label in the packet header which label is dependent on the intermediate destination of the packet and the QoS requirement of the packet and is independent of the end system from which the packet originates and is used for switching packets from the end system to the required intermediate destination.

44. An end system according to claim 42 wherein the end system comprises menu for assembling a packet to be transmitted by the end system across the segment and for placing a primary label in the packet header which label is dependent on the intermediate destination of the packet and the QoS requirement of the packet and is independent of the end system from which the packet originates and is used for switching packets from the end system to the required intermediate destination and the end system comprises means for making on demand requests for primary labels from the switching node which requests set out the intermediate destination and the QoS pair required for a packet.

45. An end system according to claim 42 wherein the end system comprises means for assembling a packet to be transmitted by the end system across the segment and for placing a primary label in the packet header which label is dependent on the intermediate destination of the packet and the QoS requirement of the packet and is independent of the end system from which the packet originates and is used for switching packets from the end system to the required intermediate destination and the end system comprises means for adding a secondary label to the packet header which secondary label is used by an intermediate destination for further switching of the packet or for packet reassembly.

* * * * *